UNITED STATES PATENT OFFICE.

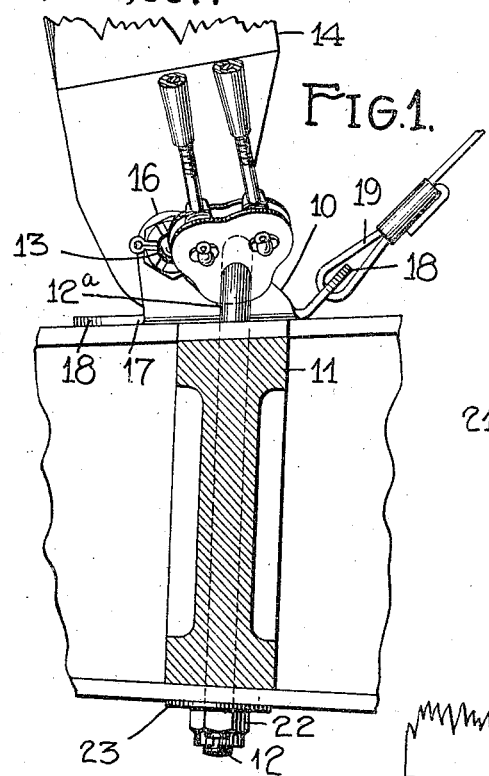
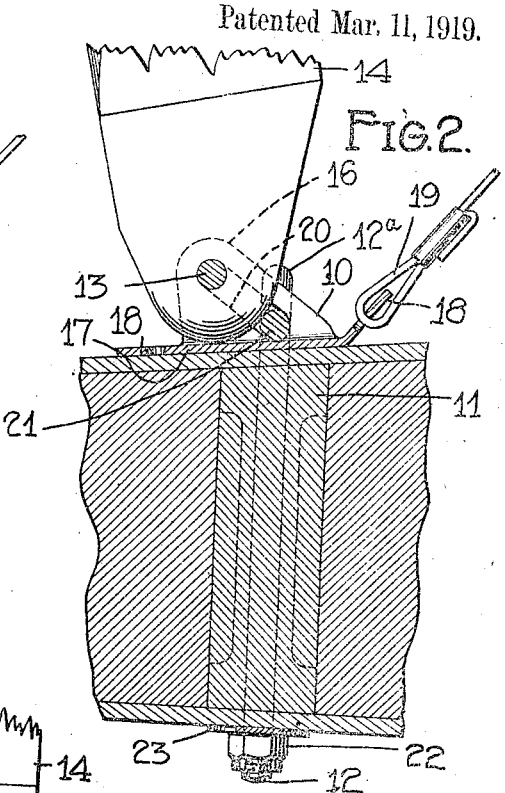
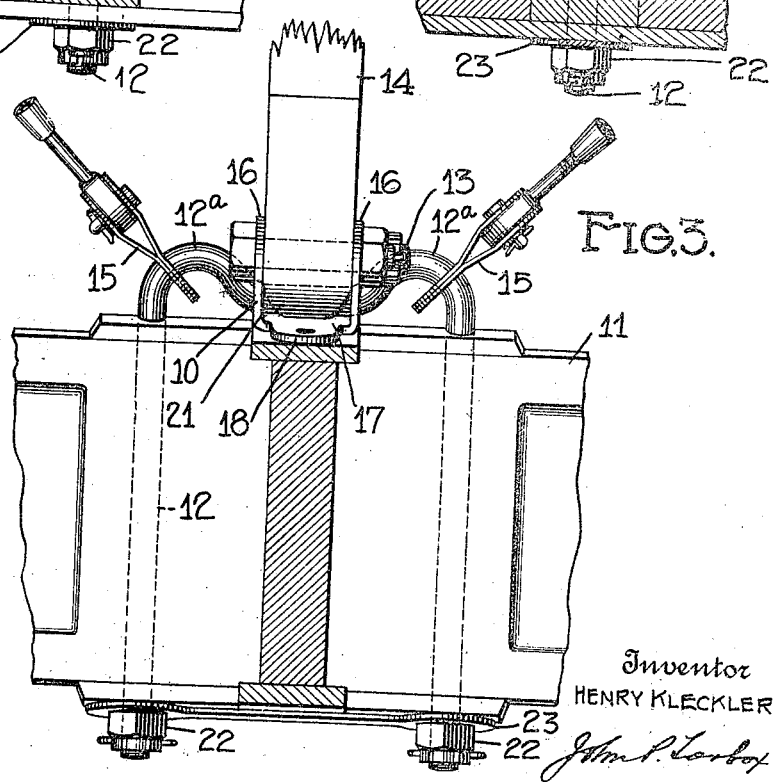

HENRY KLECKLER, OF BUFFALO, NEW YORK, ASSIGNOR TO CURTISS AEROPLANE AND MOTOR CORPORATION, A CORPORATION OF NEW YORK.

WING-POST SOCKET.

1,296,667.   Specification of Letters Patent.   Patented Mar. 11, 1919.

Application filed November 17, 1916.   Serial No. 131,963.

*To all whom it may concern:*

Be it known that I, HENRY KLECKLER, a citizen of the United States, residing at Buffalo, in the county of Erie and State of New York, have invented certain new and useful Improvements in Wing-Post Sockets, of which the following is a specification.

My invention relates in general to aeroplane strut sockets and more particularly to that class of sockets used for attaching the wing post of the aeroplane to the wing beams thereof. The wing post socket of my invention is of practically universal construction by reason of its interchangeability. Moreover, my invention provides as an integral part of the wing post socket a means whereby may be attached and secured the necessary guy or stay wires which are used to brace the aeroplane structure.

The nature and relation of the parts to be joined, *i. e.*,—wing post and wing beam is such that heretofore it has been found necessary to provide a special socket or fastening for each particular position or station along the aeroplane wing beam due to the fact that the angularity of the center line intersections of the beams and posts is different for different points along the structure. In its varied embodiments my invention is designed to overcome the aforementioned objections.

In obtaining the features which contribute to the adaptability of my socket I utilize a pressed metal fitting in conjunction with a U-bolt of special design, the combination being of such nature that the metal body or main portion of the socket serves to receive and retain the engaging wing post extremity while the U-bolt serves to secure the body of the socket to the wing beam of the aeroplane structure and simultaneously to provide suitable loops or bulged portions to which may be adjustably attached the wire pulls or stays.

These details are set forth in the drawings of which:

Figure 1 is a side view of my aeroplane wing post socket;

Fig. 2 is a view of the socket in section;

Fig. 3 is a front view of the socket in an assembly of wing beam, wing post, socket and stay wires.

In Fig. 1 the socket 10 is shown attached to the wing beam 11 by means of the U-bolt 12. The upper part of the socket 10 is drilled to receive the bolt 13 which penetrates the end of the projecting wing post 14 and thereby secures it. The U-bolt 12 is of special looped form, the loops 12$^a$ thereof serving to accomodate the clips, fastenings or terminals 15, Fig. 3, carried by the ends of the turnbuckles 16 which serve to render taut the stay wires. The main body 10 of the socket has two walls or sides rising mutually parallel from the flat base 17 which carries at its extremities the two projecting ears 18. These latter mentioned ears are drilled so that they may be bent upwardly at an angle to receive and retain the terminating loops of the drift wire extremities 19, Fig. 3. In the event that only one of these ears is utilized, which is usually the case, the remaining one is simply cut away from the main body of the socket. This disposition contributes largely to the universality of the socket.

The sides or walls 16 of the socket are provided with slots 20, Fig. 2 which serve to permit the passage of the loops 12$^a$, Fig. 3 in assembling the socket and U-bolt. It is to be noticed that the position of this slot is such that the extremities thereof are not in vertical alinement but are slightly offset one from the other, Fig. 2. The extremities of this slot form retaining interstices for the U-bolt 12 and the bolt 13. The straightened center portion 21, Fig. 3 of the U-bolt bears upon the flat base of the socket 18 and holds it securely to the wing beam 11, while the threaded portions of the U-bolt penetrate the wing beam 11 through holes drilled therein and are held by means of nuts 22 which are screwed thereon. Interposed between the nuts 22 and the wing beam 11 is a flat plate or distended washer 23 which serves as a proper bearing surface for the nuts 22 and protects the surface of the wing beam therefrom.

The extremity of the wing post 14 is shaped radially about the center of the bolt 13 and bears simultaneously upon the innermost side of the socket 17 and against the flattened center portion 21 of the U-bolt 12, Fig. 2. The flattened portion 21 of the U-bolt and the flat base of the socket combine to form an angular recess which serves to receive the projecting radial wing post extremity and prevent slippage thereof. It is readily seen that the above arrangement will permit of a limited amount of radial oscillation of the wing post 14 about the center of the bolt 13 or laterally of the socket, at the same time securely fastening the wing post to the wing beam. In lateral adjustment the ears 16 should be bent. Thus the utility of the socket is not limited to a particular location involving a specific angle of wing post and wing beam but may be used in a number of places with equal facility, since the dihedral angle, the stagger and the sweepback of the wings may be freely varied without materially affecting it. The only change which the above variation in angles involves is a slight bending of the upstanding ears 16 and the ears 17 and 18. This slight change is readily accomplished since I construct my socket of sheet metal which permits of bending to the desired forms.

In disclosing the features of my invention I have used more or less detailed forms but I do not consider my invention limited thereby as various constructional changes may later be made without in any way departing from the spirit or principle of my invention.

What is claimed is:

1. A strut socket for air craft comprising a body having upstanding ears arranged to receive a strut end between them and having therein alined slots lying in a plane at an angle to said body, securing means for the socket passing transversely through said slots at one end thereof and securing means for the strut end passing transversely of said slots toward the other end thereof.

2. A strut socket for air craft comprising upstanding ears spaced apart and having an elongated slot together with a U-bolt passing through said slot to accommodate the bight therein and arranged to secure said socket to the craft.

3. A strut socket for air craft comprising upstanding ears spaced apart and having an elongated slot together with a U-bolt passing through said slot to accommodate the bight therein and arranged to secure said socket to the craft, the bight of said U-bolt having lobes formed at its opposite corners for the attachment of lift wires.

4. A strut socket for aircraft comprising a main body and securing means therefor together forming an angular recess arranged to receive the end of a strut, together with means to attach the strut to the body of the socket.

5. A socket comprising a socket member, and a U-bolt having its bight centrally indented and bearing by its indented portion upon said socket member and having a width greater than said socket member whereby the lobes formed on the extremities of the bights by the indentation thereof may be used for the attachment of lift wires.

6. A strut socket for air craft comprising a main body having ears bent up to receive a strut end between them and provided with angular slots, a securing U-bolt having its bight indented and of a width such that when passing through said slot said indented portion bears transversely upon the body of said socket between said ears and the lobes thereof project beyond the ears of said socket respectively whereby an angular recess is formed between the body of said socket and said U-bolt to longitudinally position a strut end.

7. A strut socket for air craft comprising a main body arranged to receive a strut end, and a securing U-bolt therefor, the bight of which is indented to form lobes to which lift wires may be attached.

8. A strut socket for air craft comprising a main body together with securing means for the socket forming with the socket an angular recess to receive a strut end and by its engagement therewith limit its angular displacement.

In testimony whereof I affix my signature.

HENRY KLECKLER.